Dec. 18, 1945.　　W. M. HANNEMAN　　2,391,308
FASTENER UNIT
Filed May 17, 1941
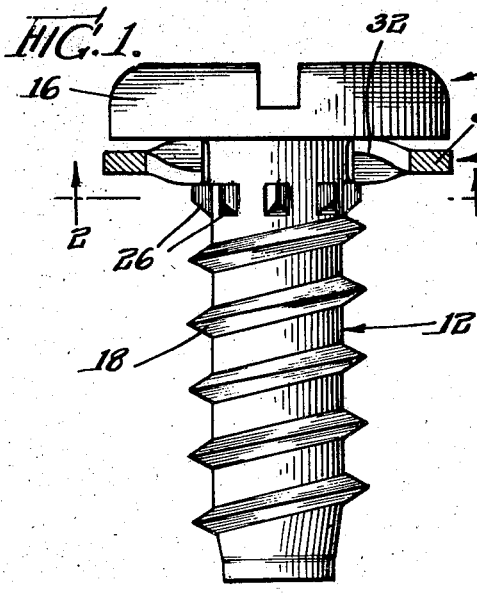
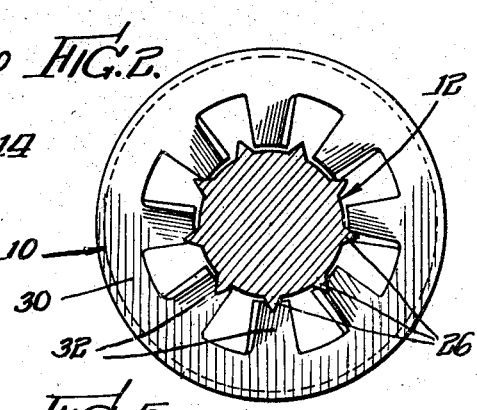
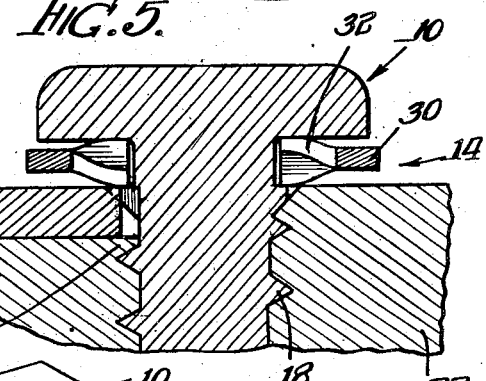
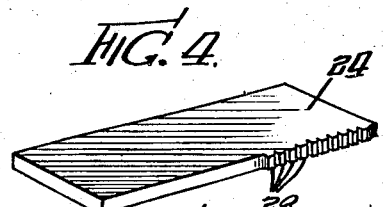
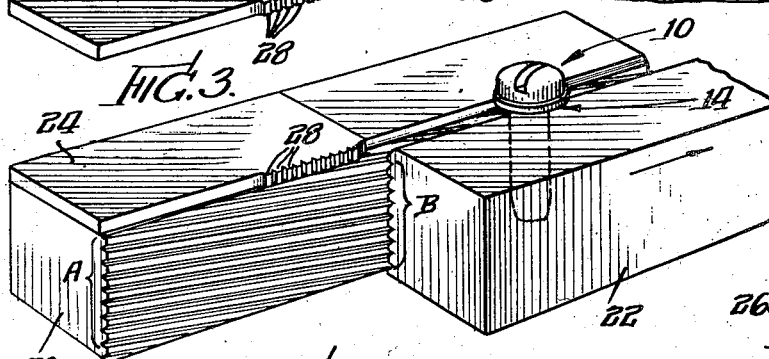
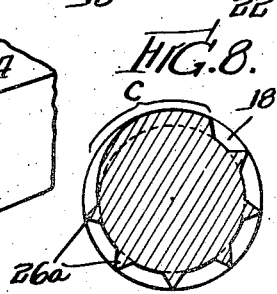
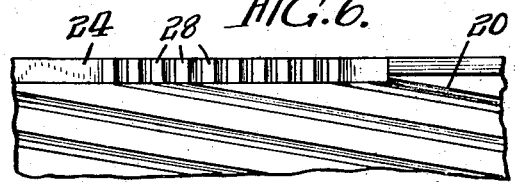
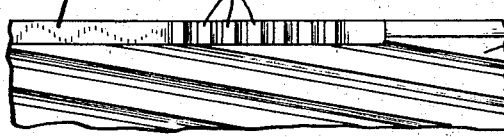
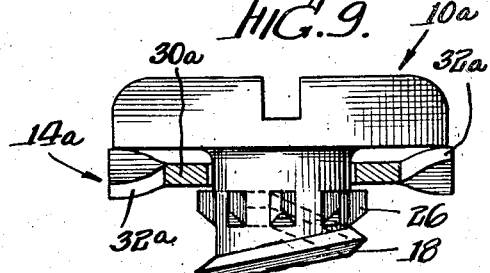
INVENTOR.
Walter M. Hanneman
BY Cox Moore & Olson
attys.

Patented Dec. 18, 1945

2,391,308

UNITED STATES PATENT OFFICE 2,391,308

FASTENER UNIT

Walter M. Hanneman, Oak Park, Ill., assignor to Illinois Tool Works, Chicago, Ill., a corporation of Illinois Application May 17, 1941, Serial No. 393,861

3 Claims. (Cl. 151—32)

This invention relates generally to screw and lock washer assemblies, hereinafter referred to as fastener units, and more particularly to fastener units of the type wherein the thread of the screw is of the coarse pitch type.

The present invention is of practical significance in instances where the fastener unit comprises a lock washer secured in operative position beneath the screw head by an extruded element beneath the washer, such as an extruded or rolled thread convolution. Experience has shown in instances where the thread of the screw element of a fastener unit is of relatively coarse pitch, the washer element has a tendency to become separated from the screw element. This results from the canting of the washer due to the coarseness of the pitch of the thread and the consequent positioning of the inner margin of the washer to rotatably follow within the relatively wide space between the thread convolutions. This relative rotation between the screw element and washer results ultimately in the separation of the parts. It is therefore a primary object of the present invention to produce fastener units of the type referred to above wherein means is provided to prevent the aforesaid axial separation of the constituent elements.

More specifically, the invention contemplates the provision of abutment means in addition to the uppermost thread convolution adjacent the washer element which will serve to prevent canting and subsequent unscrewing of the washer element.

The invention contemplates fastener units of the coarse pitch thread referred to above wherein an annular abutment section cooperates with the inner margin of the washer to maintain the plane of the washer normal to the screw axis.

The foregoing and other objects and advantages will be more apparent from the following detailed description when considered in connection with the accompanying drawing wherein:

Fig. 1 is a side elevational view of a fastener unit of the type contemplated by the present invention, the washer element thereof being shown in section;

Fig. 2 is a transverse sectional view taken substantially along the line 2—2 of Fig. 1;

Fig. 3 is a fragmentary perspective view of die members which may be employed to simultaneously produce the coarse pitch thread and lock washer retaining means contemplated by the present invention;

Fig. 4 is a perspective view of the plate associated with the stationary die member for forming the washer retaining protuberances or nubs;

Fig. 5 is an enlarged fragmentary vertical sectional view taken across the die members to more clearly illustrate the manner in which said die members cooperate to simultaneously produce the coarse pitch thread and lock washer retaining protuberances;

Fig. 6 is an enlarged fragmentary front elevational view of the stationary die of Fig. 3;

Fig. 7 is a view similar to Fig. 6 disclosing a die plate of modified form equipped with a fewer number of protuberance producing teeth;

Fig. 8 is a transverse sectional view taken across the shank of the screw in the vicinity of the head thereof which has been rolled by the die structure shown in Fig. 7; and Fig. 9 is a fragmentary elevational view similar to Fig. 1 disclosing a fastener unit equipped with a lock washer having outer marginal teeth as distinguished from the inner marginal teeth shown in Fig. 1.

Referring now to the drawing more in detail wherein like numerals have been employed to designate similar parts throughout the various figures, it will be seen that one embodiment of the invention resides in a fastener unit designated generally by the numeral 10. This fastener unit 10 includes a screw element 12 and a washer element 14.

The screw member 12 is formed with a head 16 at one extremity, the shank of the screw having formed thereon a relatively coarse pitch or long lead thread 18. The thread 18 is produced by conventional die serrations or teeth included within brackets A and B of die blocks 20 and 22, respectively, Fig. 3. As disclosed in Fig. 3, the die block 20 is stationary and the die block 22 is shiftable. Particular attention is directed to a die plate 24 associated with the die block 20 which is employed to produce washer retaining protuberances or nubs 26, Figs. 1 and 2. A section of this die plate 24 is formed with teeth or serrations 28. The number and size of the teeth 28 is such that when a given size of screw blank is rolled between the die members 20 and 22 a plurality of equally spaced protuberances 26 will be formed around the screw shank immediately beneath the washer element 14, as clearly illustrated in Fig. 2. The engagement of the teeth 28 with the periphery of the screw shank causes the extrusion of the protuberances 26 and a resulting increase in the diameter of the screw shank in this vicinity. In other words, the protuberances or nubs 26 thus formed project outwardly a sufficient distance to underlie the inner margin of the washer 14 and thus serve to maintain the washer normal to the screw axis.

In producing the fastener unit 10, the lock washer 14, which in the present disclosure includes an annular outer body 30 and a plurality of internal locking members 32, is first telescopically associated with an unthreaded screw blank. This blank is then rolled between the die block 20 and plate 24 on one side and the die block 22 on the other side, as clearly illustrated in Fig. 3. In instances where it is not desirable to produce locking protuberances or nubs about the complete periphery of the screw blank, a die plate 24a, as shown in Fig. 7, may be employed. This die block 24a has a lesser number of nub producing teeth 28a than the plate 24. It will also be noted that these teeth 28a are so positioned with respect to the serrations on the die block 20 as to only act on that portion of the screw body which is not superimposed by the thread 18. In other words, the finishing portion of the thread 18 adjacent the washer 14 is not engaged by the teeth 28a but that portion of the screw body which constitutes the unthreaded area is engaged by the teeth 28a. The resulting configuration is illustrated in the transverse cross-section shown in Fig. 8. In this figure, the portion included within the bracket C is a section of the thread 18 and the remaining unthreaded portion of the screw shank is formed with nubs or washer retaining protuberances 26a.

In Fig. 9 I have shown a fastener unit designated generally by the numeral 10a which is similar in all respects to the fastener unit 10 of Fig. 1 except that the washer portion 14a thereof is provided with an internal annular body 30a and external locking members 32a. The extruded protuberances or nubs on the screw shank cooperate to prevent canting of the washer 14a.

From the foregoing it will be apparent that the present invention contemplates a fastener unit of the type incorporating a coarse pitch screw element wherein the possibility of separation of the constituent parts is positively precluded. No canting of the washer element can take place due to the presence of the extruded protuberances or nubs and hence the inner margin of the washer does not enter in the space between the thread convolutions. Obviously the axial extent of the washer retaining ribs or protuberances may be controlled by employing a plate 24—24a of desired thickness.

Although the plate 24—24a may be of any desired thickness, it has been found in practice that a plate of a certain minimum thickness is necessary to produce ribs of sufficient strength to form the corresponding nubs on the screw shank. When, however, the plate is of sufficient thickness to afford this required strength the nubs may be longer than is desired. It has been found that the lower portion of these longer nubs can be rolled out by means of the thread portion of the die 20 positioned to the right of the plate 24, as viewed in Fig. 3. In this way an interrupted thread convolution or portion thereof is presented in the vicinity of the washer. As viewed in Fig. 1 this interrupted portion of the thread convolution would be positioned to the rear of the screw immediately beneath the lock washer. It will be noted in both Figs. 6 and 7 that the serrations of the die block 20 positioned to the right of the plates 24—24a extend above the lowermost plane of the plates and this structural arrangement causes the traversing of the nubs or protuberances referred to above.

Obviously it is preferable to have the thread on the screw body extend into juxtaposition with respect to the retained washer. In the present disclosure the washer retaining elements or nubs 26—26a are of relatively short axial extent. It will also be apparent that the invention contemplates a novel method of forming the washer retaining elements or nubs simultaneously with the rolling of the coarse pitch thread on the screw blank. This method makes it possible to very economically produce a circumferential protruding continuance of the terminating portion of the thread. It is this protruding circumferential or annularly disposed continuance of the thread termination in the vicinity of the free side of the washer which prevents canting and consequent unscrewing thereof.

Obviously the invention is not limited to the specific disclosure herein but is capable of other modifications and changes without departing from the spirit and scope of the appended claims.

The invention is hereby claimed as follows:

1. A fastener unit including a headed screw element having a relatively coarse pitch thread terminating in the vicinity of the clamping side of the screw head, a washer encircling the screw element in the vicinity of the head thereof immediately adjacent the termination of said thread, said thread being larger in external diameter than the inner diameter of the washer, and means formed integral with the screw element at the free side of the washer member and comprising an annularly disposed continuation of the thread terminal in that vicinity of substantial circumferential extent for engaging the inner margin of said washer member to prevent canting of the washer member and the consequent unscrewing thereof.

2. A fastener unit including a headed screw element having a relatively coarse pitch thread terminating in the vicinity of the clamping side of the screw head, a washer encircling the screw element in the vicinity of the head thereof immediately adjacent the termination of said thread, said thread being larger in external diameter than the inner diameter of the washer, and means including a plurality of protuberances formed integral with the screw element and continuing from the thread terminal at the free side of the washer member for engaging the inner margin of said washer member to prevent canting of the washer member and the consequent unscrewing thereof.

3. A fastener unit including a headed screw element having a relatively coarse pitch thread terminating in the vicinity of the clamping side of the screw head, a washer encircling the screw element in the vicinity of the head thereof immediately adjacent the termination of said thread, said thread being larger in external diameter than the inner diameter of the washer, and means including a plurality of circumferentially spaced protuberances formed integral with the screw element and continuing from the thread terminal at the free side of the washer member for engaging the inner margin of said washer member to prevent canting of the washer member and the consequent unscrewing thereof.

WALTER M. HANNEMAN.